United States Patent [19]
Devan et al.

[11] Patent Number: 5,465,985
[45] Date of Patent: Nov. 14, 1995

[54] WHEELED PORTABLE COOLER

[76] Inventors: Colleen M. Devan; William M. Devan, both of 113 Pondview Rd., Weare, N.H. 03281

[21] Appl. No.: 226,989

[22] Filed: Apr. 13, 1994

[51] Int. Cl.⁶ .................................................. B62B 3/02
[52] U.S. Cl. .......................... 280/30; 62/457.7; 280/38; 280/43; 280/47.371; 301/114
[58] Field of Search .................................. 280/47.35, 30, 280/640, 37, 655, 655.1, 43, 43.11, 43.14, 43.27, 47.34, 47.371, 79.11, 38, 641; 62/457.7; 301/111, 114, 119, 121, 122

[56] References Cited

U.S. PATENT DOCUMENTS

| | | | |
|---|---|---|---|
| D. 328,221 | 7/1992 | Piccarillo | D7/605 |
| 3,499,177 | 3/1970 | Wolfe | 280/43 |
| 4,172,365 | 10/1979 | McClintock | 62/381 |
| 4,412,689 | 11/1983 | Lee | 280/655.1 |
| 4,724,681 | 2/1988 | Bartholomew et al. | 62/239 |
| 4,846,493 | 7/1989 | Mason | 280/641 |
| 4,932,677 | 6/1990 | Shustack | 280/28.5 |
| 5,285,656 | 2/1994 | Peters | 280/30 |
| 5,306,029 | 4/1994 | Kaiser | 280/30 |
| 5,373,708 | 12/1994 | Dumoulin | 280/30 |

Primary Examiner—Anne Marie Boehler

[57] ABSTRACT

A refrigerant container is provided having retractable wheels mounted to the container front and rear walls in adjacency to the first and second side walls, with the wheels arranged for latching in a raised and lowered orientation relative to the container structure.

6 Claims, 3 Drawing Sheets

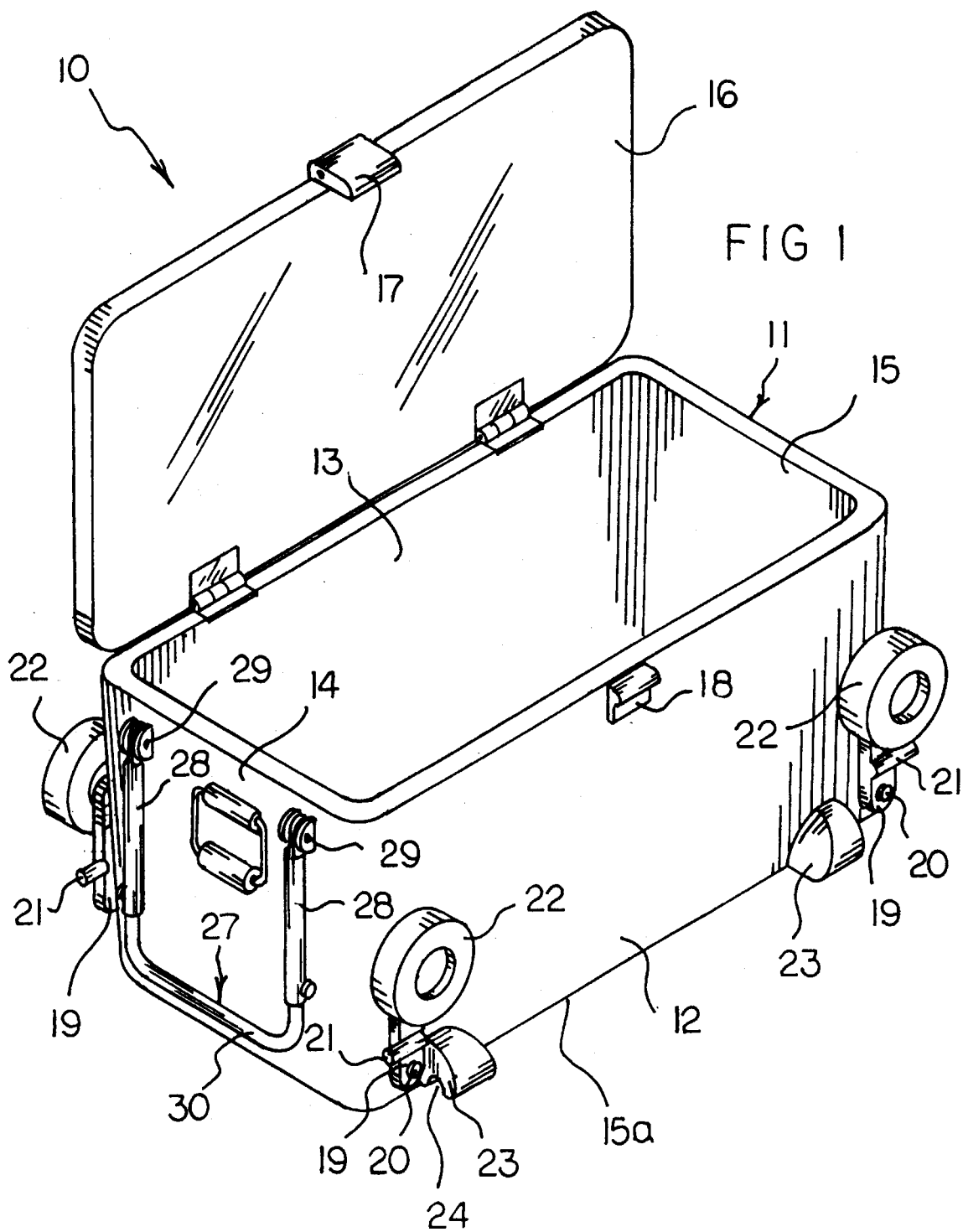

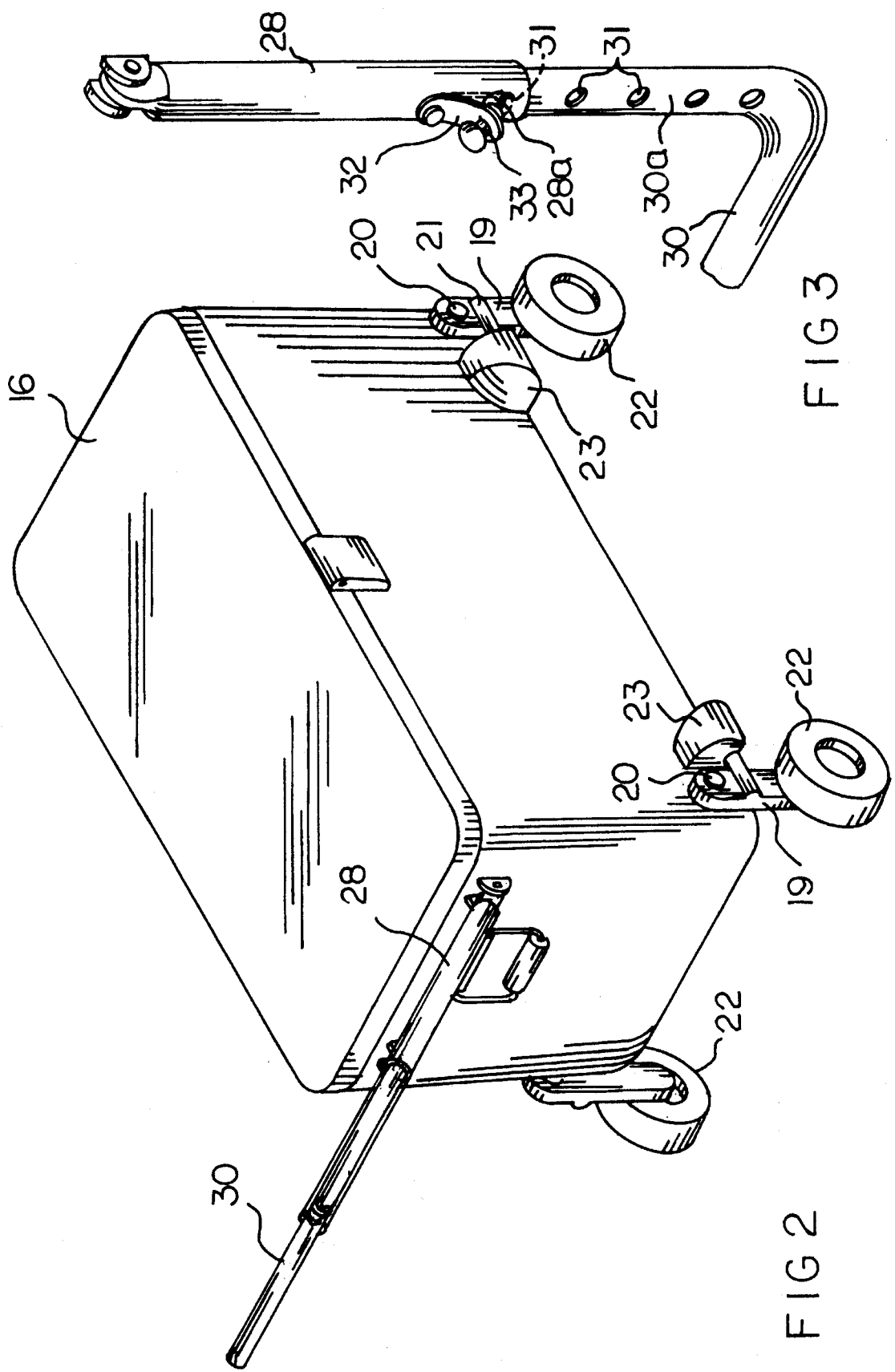

WHEELED PORTABLE COOLER

BACKGROUND OF THE INVENTION

1. Field of the Invention

The field of invention relates to portable cooler apparatus, and more particularly pertains to a new wheeled portable cooler wherein the same is arranged for the ease of transport relative to the cooler.

2. Description of the Prior Art

Portable coolers of various types have been indicated in the prior art and exemplified by the U.S. Pat. Nos. 4,846, 493; 4,932,677; and 4,724,681.

The instant invention attempts to overcome deficiencies of the prior art by providing for a portable cooler structure with an improved retractable wheel structure arranged for ease of retraction and extension relative to the cooler structure and in this respect, the present invention substantially fulfills this need.

SUMMARY OF THE INVENTION

In view of the disadvantages inherent in the known types of portable cooler apparatus now present in the prior art, the present invention provides a wheeled portable cooler wherein the same includes wheel members mounted adjacent each corner of the cooler arranged for ease of retraction and extension relative to the cooler floor.

To attain this, the present invention provides a refrigerant container having retractable wheels mounted to the container front and rear walls in adjacency to the first and second side walls, with the wheels arranged for latching in a raised and lowered orientation relative to the container structure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new wheeled portable cooler which may be easily and efficiently manufactured and marketed.

It is a further object of the present invention to provide a new wheeled portable cooler which is of a durable and reliable construction.

An even further object of the present invention is to provide a new wheeled portable cooler which is capable of a low cost of manufacture with regard to both materials and labor, and which accordingly is then capabale of low prices of sale to the consuming public, thereby making such wheeled portable coolers economically available to the buying public.

Still yet another object of the present invention is to provide a new wheeled portable cooler which provides in the apparatuses and methods of the prior art some of the advantages thereof, while simultaneously overcoming some of the disadvantages normally associated therewith.

Even still yet another object of the present invention is to provide a new wheeled portable cooler container having retractable wheels mounted to the container front and rear walls in adjacency to the first and second side walls, with the wheels arranged for latching in a raised and lowered orientation relative to the container structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description. Such description makes reference to the annexed drawings wherein:

FIG. 1 is an isometric illustration of the invention.

FIG. 2 is an isometric illustration of the cooler with the wheels in an extended orientation.

FIG. 3 is a partial isometric illustration of the transport handle structure and its interlocking relationship.

DESCRIPTION OF THE PREFERRED EMBODIMENT

Figure 5:
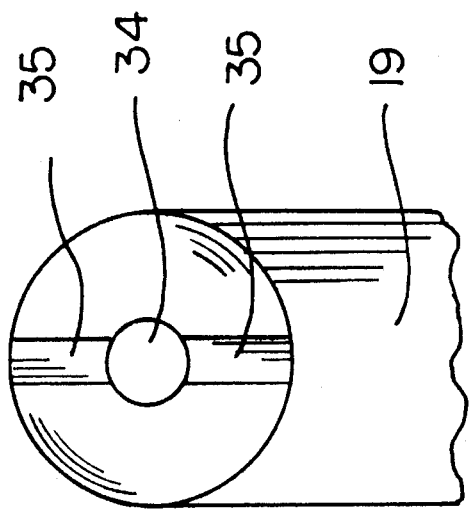
FIG. 5 is an orthographic view, taken along the lines 5—5 of FIG. 4 in the direction indicated by the arrows.

With reference now to the drawings, and in particular to FIGS. 1–5 thereof, a new wheeled portable cooler embodying the principles and concepts of the present invention and generally designated by the reference numeral 10 will be described.

More specifically, the wheeled portable cooler 10 of the instant invention comprises an insulated container body 11 having a front wall 12 spaced from a rear wall 13, with first and second side walls 14 and 15 mounted upon a container floor 15a. A lid 16 employing spaced hinges is pivotally mounted to the container rear wall 13, with a latch 17 mounted to the lid spaced from the hinges arranged for securement to a latch flange 18 on the container front wall 12.

Figure 4:
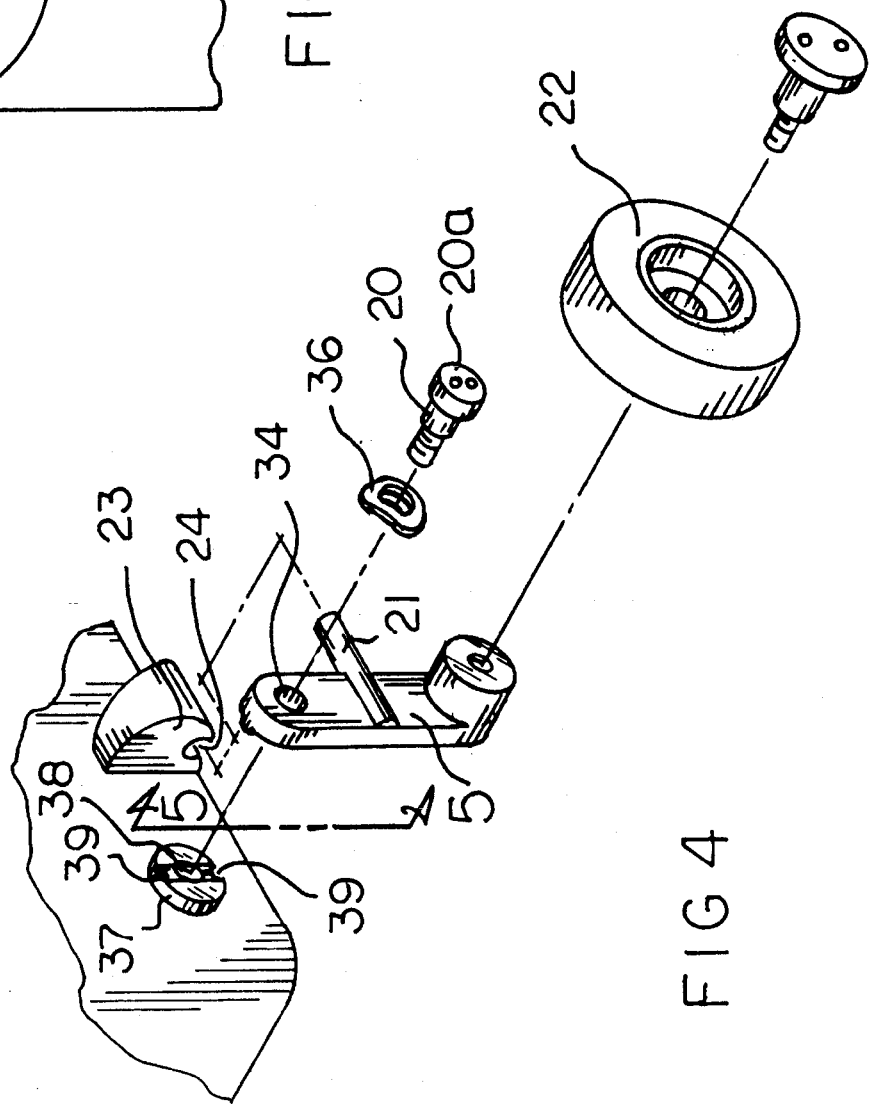
FIG. 4 is an isometric exploded view indicating the latching mechanism of the retractable wheel structure.

As best illustrated in FIGS. 1, 4, and 5, four flange plates 19 are provided, each being pivotally mounted to the container 11 about a pivot axle 20, with the plurality of flange plates 19 mounted to both the front and rear walls 12 and 13 and positioned in adjacency relative to the first and second side walls 14 and 15. Each of the flanges plates 19 includes an abutment lug 21 projecting laterally from each flange plate, with a wheel member 22 rotatably mounted to a distal end of each flange plate with respect to an associated pivot axle 20. By this structure, the flange plates 19 may be lowered to project below the floor 15a of the container 11, whereby the wheel members 22 rollingly support the container above a ground surface.

To removably fix the flange plates 19 in an extended position, a lug member 23 is positioned fixedly onto the container 11 in adjacency relative to each flange plate, with each lug member having a socket 24 to complementarily receive a respective abutment lug 21 of each flange plate when each flange plate is in a lowered orientation, such as indicated in FIG. 2. Specifically, the socket 24 is configured to be slightly resilient to allow the abutment lug 21 to snap thereinto to releasably secure the flange plate in the lowered orientation. Reference to the FIGS. 4 and 5 indicates structure which secures the flange plate 19 in the first raised position and further secures the flange plate in the second lowered position, and it can be seen from these figures that each flange plate includes a rear wall having a plurality of flange plate ribs 35 longitudinally aligned and positioned on opposed sides of a flange plate bore 34 receiving the axle 20 therethrough. A spring washer 36 is interposed between the axle head 20a and the flange plate to bias the ribs 35 into complementarily configured grooves 39 directed into an axle boss 37 secured to the container 11 and having an axle boss bore 38. The axle boss bore 38 is coaxially aligned with the flange plate bore 34 and permits the ribs 35 to deflect the spring washer 36 to permit rotation of the flange plate relative to the axle boss 37, with the spring plate biasing the ribs 35 within the grooves 39 when the flange plate is in the first or second position, such as indicated in the FIGS. 1 and 2, respectively. In this manner the flange plates 19 may be stored in the first or raised position, and, in conjunction with the lug members 23, are further secured when in the second or lowered position.

To facilitate manually pulling of the device 10, the first side wall 14 is provided with a transport handle 27 having first and second spaced handle tubes 28 pivotally mounted about tube axles 29 to the first side wall, with each of the handle tubes receiving the legs 30a of a U-shaped handle 30. As illustrated in FIG. 3, the U-shaped handle 30 includes handle bores 31 directed into the legs, such that a spring plate 32 mounted onto at least one of the handle tubes 28 is provided with a spring plate lug 33 mounted onto the spring plate to direct the lug 33 through a handle tube bore 28a and into one of the handle bores 31 to permit fixation, extension, and retraction of the U-shaped handle 30 relative to the handle tubes 28.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. (Amended) A wheeled portable cooler comprising:

an insulated container body, having a front wall spaced from a rear wall, a first side wall spaced from a second side wall, with said front wall and said rear wall intersecting said first side wall at first corners, and said front wall and said rear wall intersecting said second side wall at second corners;

a lid pivotally mounted to said container body;

latch means mounted to said lid for securement of said lid to said front wall;

a plurality of flange plates, each of said flange plates having a plate first end spaced from a plate second end, with an abutment lug projecting laterally of said flange plate between said flange plate first end and said flange plate second end, with each of said flange plates being pivotally mounted at said first end thereof to an individual one of said corners of said container body;

a plurality of wheel members, with each wheel member being rotatably mounted to an individual one of said flange plates adjacent said second end of said flange plate;

a plurality of lug members, each of said lug members mounted to said container body adjacent a respective one of said flange plates, with each of said lug members having a socket to receive said abutment lug when said flange plate is arranged in a lowered position extending beneath said container body; wherein each of said flange plates includes a flange plate front wall and a flange plate rear wall, said flange plates each having a flange plate bore extending therethrough at said first end thereof, with said rear wall of each of said flange plates having a plurality of ribs longitudinally aligned on diametrically opposed sides of said flange plate bore, and further comprising a plurality of pivot axles each having a pivot axle head, with each pivot axle projecting through said flange bore of an individual one of said flange plates, a plurality of axle bosses each having an axle boss bore and longitudinally aligned axle boss grooves positioned on diametrically opposed sides of said axle boss bore, said axle bosses being fixedly mounted to said container body proximate an individual one of said corners thereof, and each axle boss bore receiving an individual one of said pivot axles to pivotally mount said flange plates to said container body, and a plurality of spring washers with each spring washer interposed between an individual one of said pivot axle heads and an individual one of said flange plates to bias said ribs into said grooves.

2. A portable cooler as set forth in claim 1, and further comprising a transport handle having first and second spaced handle tubes pivotally mounted to said first side wall, and a U-shaped handle having spaced handle legs, with each of said legs being received within an individual one of said handle tubes, and means for locking said handle legs relative to said handle tubes.

3. A portable cooler as set forth in claim 2, wherein said the U-shaped handle includes a plurality of handle bores directed into each of said legs, and each of said handle tubes includes a handle tube bore, and further wherein said locking means comprises a spring plate mounted onto at least one of said handle tubes, and a spring plate lug mounted onto said spring plate and arranged to enter said handle tube bore and project into one of said handle bores to permit fixation of said U-shaped handle relative to at least one of said handle tubes.

4. A wheeled portable cooler comprising:

an insulated container body, having a front wall spaced from a rear wall, a first side wall spaced from a second side wall, with said front wall and said rear wall intersecting said first side wall at first corners, and said front wall and said rear wall intersecting said second side wall at second corners;

a plurality of flange plates, each of said flange plates having a plate first end spaced from a plate second end, with an abutment lug projecting laterally of said flange plate between said flange plate first end and said flange plate second end, with each of said flange plates being pivotally mounted at said first end thereof to an individual one of said corners of said container body;

a plurality of wheel members, with each wheel member being rotatably mounted to an individual one of said flange plates adjacent said second end of said flange plate;

a plurality of lug members, each of said lug members mounted to said container body adjacent a respective one of said flange plates, with each of said lug members having a socket to receive said abutment lug when said flange plate is arranged in a lowered position extending beneath said container body;

wherein each of said flange plates includes a flange plate front wall and a flange plate rear wall, said flange plates each having a flange plate bore extending therethrough at said first end thereof, with said rear wall of each of said flange plates having a plurality of ribs longitudinally aligned on diametrically opposed sides of said flange plate bore, and further comprising a plurality of pivot axles each having a pivot axle head, with each pivot axle projecting through said flange bore of an individual one of said flange plates, a plurality of axle bosses each having an axle boss bore and longitudinally aligned axle boss grooves positioned on diametrically opposed sides of said axle boss bore, said axle bosses being fixedly mounted to said container body proximate an individual one of said corners thereof, and each axle boss bore receiving an individual one of said pivot axles to pivotally mount said flange plates to said container body, and a plurality of spring washers with each spring washer interposed between an individual one of said pivot axle heads and an individual one of said flange plates to bias said ribs into said grooves.

5. A portable cooler as set forth in claim 4, and further comprising a transport handle having first and second spaced handle tubes pivotally mounted to said first side wall, and a U-shaped handle having spaced handle legs, with each of said legs being received within an individual one of said handle tubes, and means for locking said handle legs relative to said handle tubes.

6. A portable cooler as set forth in claim 5, wherein the U-shaped handle includes a plurality of handle bores directed into each of said legs, and each of said handle tubes includes a handle tube bore, and further wherein said locking means comprises a spring plate mounted onto at least one of said handle tubes, and a spring plate lug mounted onto said spring plate and arranged to enter said handle tube bore and project into one of said handle bores to permit fixation of said U-shaped handle relative to at least one of said handle tubes.

* * * * *